3,093,641
PRODUCTION OF CYANURIC ACID
Robert L. Formaini, Petersburg, Va., assignor to Allied Chemical Corporation, New York, N.Y., a corporation of New York
Filed Dec. 12, 1958, Ser. No. 779,966
5 Claims. (Cl. 260—248)

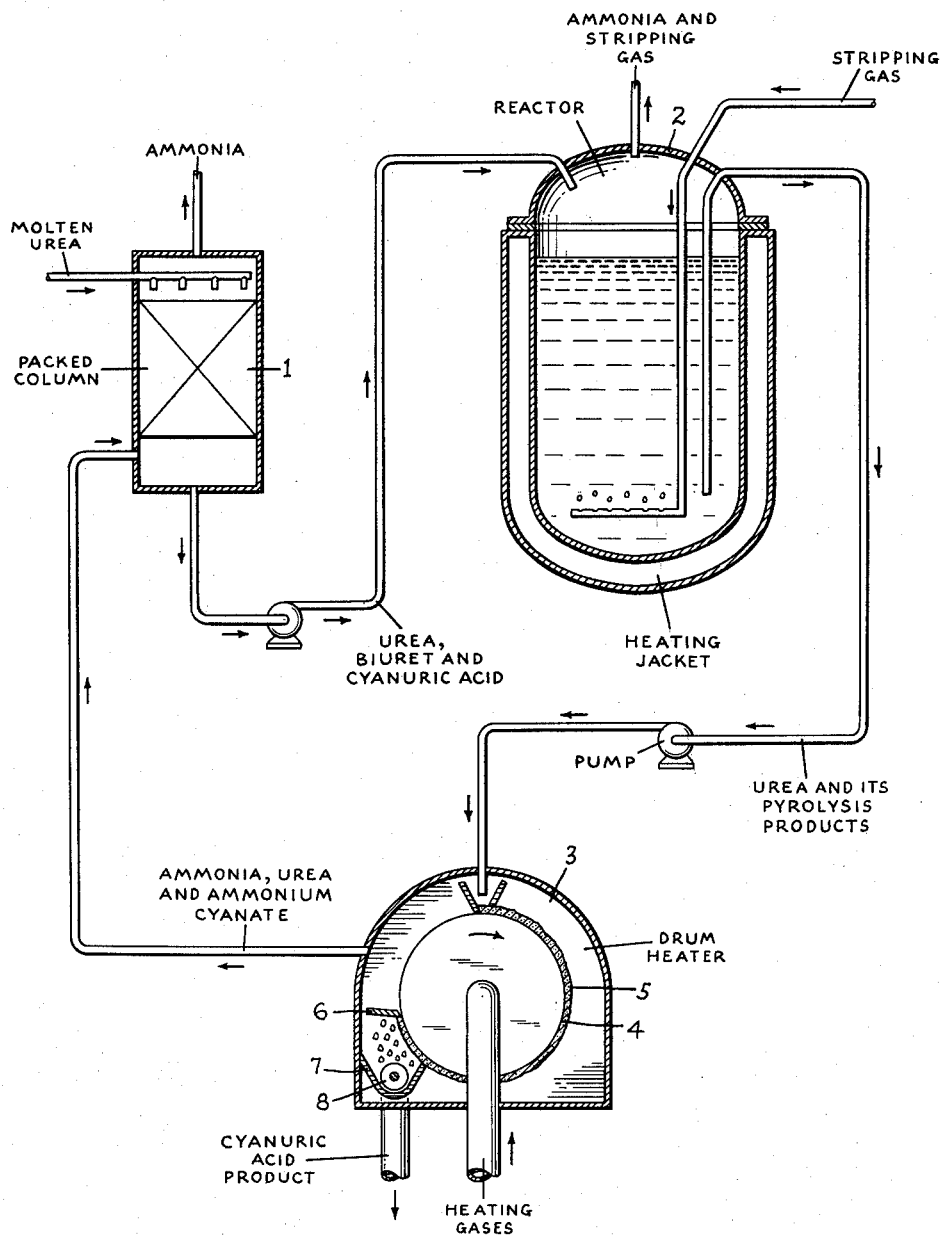

This invention relates to the production of cyanuric acid by pyrolyzing urea and, more particularly, to a two-step process in which the urea is first heated to convert it in large part to biuret, triuret and cyanuric acid, followed by a separate step in which the product of the first step is further heated to substantially complete the decomposition of the urea and to produce cyanuric acid in high yields.

It is known that by heating urea at temperatures of the order of 200° C. to about 300° C. it decomposes, with the formation of cyanuric acid and other pyrolysis products of the urea, including biuret, triuret and ammonium cyanate; the relative amounts of these products formed being dependent upon the temperature at which the urea is heated.

When such a process is to be used for the production of cyanuric acid it presents serious problems of effectively heating the reaction mass during the later stages of the reaction. Initially the molten urea is fluid and readily agitated to promote indirect heat transfer from a heating medium supplied to an internal or external heater for the reaction vessel and to maintain substantially uniform temperatures throughout the mass being heated. As the pyrolysis of the urea proceeds, the reaction mass passes from this fluid melt or thin slurry to a heavy slurry when the content of cyanuric acid in the reaction mixture has risen to about 35%. With further heating and increase in the cyanuric acid content, the material forms a solid cake which has poor heat conduction. It becomes impossible to stir the material to promote the heat transfer required by the strongly endothermic reactions leading to the formation of cyanuric acid. As a result, the effectiveness of heating the material by indirect heat transfer decreases materially. The reaction rate slows down or excessively high temperatures of the heating surfaces and contiguous material being heated must be maintained. These have an adverse effect on the conversion to cyanuric acid. The formation of the byproducts reduces the efficiency of the conversion of the urea to the desired cyanuric acid.

I have now discovered a particular procedure whereby cyanuric acid may be produced by pyrolysis of urea, with high efficiency in conversion of the urea to cyanuric acid and with increased efficiencies in the heating of the reaction mixture and ease of controlling the conditions under which the reactions are carried out.

It is a further advantage of my process that one obtains a flaked or powdered product of suitable particle size, instead of the products of prior art processes which require conditioning to give material of suitable physical properties.

In operating in accordance with my invention, a body of molten urea is heated and maintained at a temperature in the range about 135° C. to 215° C., preferably about 155° C. to 190° C. A stripping gas is passed through and in intimate contact with the molten body to remove ammonia which is evolved as a result of the reactions taking place. The reaction mixture is thus heated until at least about 50% of the urea has been decomposed and the heating is discontinued before the unreacted urea remaining in the reaction product of this step of my process has been decreased substantially below 30% and the mass ceases to be mobile when it is heated to a temperature in the range 135° C. to about 215° C. This decomposition of the urea is attained in a period of about 10 minutes to 2 hours, the time required depending principally upon the temperature employed and secondarily on the rate of passage of the stripping gas through the molten mass. In addition to urea, the product of this heating will contain cyanuric acid, biuret and triuret in proportions dependent upon the temperature at which the reaction mixture is heated. The following table shows the composition of the product (in percent by weight) with respect to urea, cyanuric acid and total biuret and triuret, when the heating is at the given temperature and is discontinued when the stated percent of undecomposed urea remains in the product of this heating step.

| Temperature, °C. | Urea | Cyanuric acid | Biuret plus triuret |
|---|---|---|---|
| [1] 150 | 54 | 2 | 43 |
| [2] 150 | 30 | 7 | 62 |
| [1] 165 | 54 | 4 | 42 |
| [2] 165 | 29 | 19 | 51 |
| [1] 185 | 55 | 4 | 40 |
| [2] 185 | 32 | 32 | 35 |
| [1] 215 | 56 | 9 | 34 |
| [2] 215 | 33 | 35 | 30 |

[1] 50–51% of the urea decomposed.
[2] 72–76% of the urea decomposed.

All the products of urea pyrolysis of the above table are pumpable at a temperature no higher than 215° C. Except for the product prepared by heating the urea at 185° C. containing 32% urea and 32% cyanuric acid, every one forms a mobile melt or slurry which is pumpable at the temperature at which the urea is heated to form the product of the stated composition.

The cyanuric acid content of the urea pyrolysis product primarily affects the mobility of the urea pyrolysis product when it is heated at a given temperature. As shown by the above table, the temperature and degree of decomposition of the urea are controlling factors on the cyanuric acid content of the product. To insure the pyrolysis product has sufficient mobility at the temperature at which it is prepared to be readily pumpable to the second step of my process, I prefer to discontinue the heating of the urea not only before the urea content of the product of this step of my process falls substantially below 30%, but also before the cyanuric acid content increases to above about 20%.

As pointed out above a secondary influence on the time required for attaining the desired decomposition of the urea is the rate of passing the stripping gas through the fluid mass being heated. As a practical matter, this rate is suitably about 0.5 to about 4.0 mols of the gas per mol of urea charged to the reaction per hour.

In the second step of my process, the product obtained by partial decomposition of the urea, at a temperature up to 215° C. at which it is a melt or mobile slurry of products of the partial pyrolysis of the urea, is spread as a sheet or film of no greater thickness than about 0.5 inch on a hot surface maintained at a temperature in the range 200° C. to 300° C. Preferably, the surface is maintained at a temperature above 215° C. When substantially complete decomposition of the urea is attained, the resulting solid material is removed from the heated surface. The product thus obtained is principally cyanuric acid accompanied by a minor amount of ammelide and ammeline and a total of only a few percent of biuret, triuret and residual undecomposed urea.

The accompanying drawing shows apparatus suitably employed in practicing my invention to produce cyanuric acid by the following example of a procedure embodying that invention.

*Example 1.*—Molten substantially anhydrous urea at about 150° C. to about 170° C., preferably at about 165° C., is supplied to the top of a packed column 1 of the drawing and flows downwardly through the column while being maintained at a temperature of about 165° C. Ammonia gas carrying in suspension urea and cyanuric acid from a drum heater 3, the operation of which is hereinafter described, is introduced at about 200° C. into the bottom of column 1. The ammonia gas passes upwardly through the column and is withdrawn from the top of the column. The urea and cyanuric acid in the gas entering the column is taken up by the hot urea melt. During the passage of the urea through the column at the elevated temperature at which it is maintained, which is preferably about 165° C., the molten urea is partially decomposed, with the formation of biuret, triuret and cyanuric acid and evolution of gaseous ammonia which joins that introduced into the column and is withdrawn in the ammonia gas leaving the top of the column. Ammonium cyanate absorbed from the gas supplied to the bottom of column 1 is also decomposed to form cyanuric acid or its precursors urea and biuret.

The urea melt now containing biuret, triuret and cyanuric acid is drawn from the bottom of the column and is passed into a reactor 2 provided with a heating jacket. The body of material in the reactor is heated at 165° C. for about 1.8 hours with air passed through it at the rate of about 1.5 mols air per mol urea supplied to the reactor per hour to serve as a stripping gas aiding to convert the urea to biuret and cyanuric acid. The molten mobile pyrolyzate formed in reactor 2 under these conditions has substantially the composition: 31% urea, 43% biuret, and 26% cyanuric acid plus triuret.

This molten pyrolyzate, which contains substantially no solids, is pumped to a drum heater 3. Heater 3 is of substantially the same construction and mode of operation as the well-known drum driers in which material spread on the surface of the drum is heated by a heating medium supplied to the interior of the drum.

Nickel alloys having substantially the composition 14%–19% molybdenum, 12%–17% chromium, 3%–8% iron, 3%–5.5% tungsten and the remainder substantially all nickel, are suitable materials of construction for the drum heater, or at least of those parts contacted by the hot urea pyrolysis products.

The mobile material introduced to this heater is spread on the surface of a rotating metallic drum 4 in the form of a sheet or film 5 having a thickness which is preferably less than 0.3 inch. Hot gases, such as combustion products, are passed through the interior of the drum to heat the drum surface to a temperature of about 240° C. to about 270° C. As the drum carrying the sheet or film of material deposited on its surface revolves, this material is further pyrolyzed until substantial completion of the decomposition of the urea is obtained. A residence time of 1–10 minutes on the hot drum surface suffices for the completion of this pyrolysis of the product supplied to the drum heater. The rate of rotation of the drum is such that when this pyrolysis has been completed, the material on the drum surface has advanced to a point at which a knife 6 removes the pyrolyzed product from the drum surface and drops it into a collector 7, from which it is withdrawn by a screw conveyor 8 as the cyanuric acid product of my process.

Ammonia accompanied by ammonium cyanate vaporized from the hot material and urea entrained in the ammonia gas, is evolved by the further pyrolysis in the drum heater of the product from reactor 2. This ammonia is drawn from the chamber surrounding the drum and passed into the bottom of column 1. The ammonia gas is drawn off from the top of column 1, and the urea and ammonium cyanate recovered from the gas by washing it with the urea supplied to the column is recycled to reactor 2 in the molten urea from the bottom of column 1 for their conversion into cyanuric acid.

In operating this process under the specific conditions given above, for every 2954 parts of molten urea supplied to column 1 the melt leaving the bottom of the column will contain about 2400 parts urea, about 620 parts biuret, and about 520 parts cyanuric acid plus triuret. Upon further treatment of this melt in reactor 2 and distributing the product on the surface of the drum of heater 3 as a film about 0.06 inch thick, maintaining the drum at about 270° C., and removing the material from the drum after a reaction period of about 60 seconds, the resulting product contains about 82% cyanuric acid, about 14% ammelide plus ammeline, and less than 4% total urea, biuret and triuret. About one part by weight of this cyanuric acid product is obtained for every 1.5 parts of the molten urea introduced into the top of column 1. This product itself is useful, but generally it will be subjected to known treatments to recover a cyanuric acid of any desired higher purity.

If desired, heater 3 may take the form of a heated endless belt on which the partial pyrolysis product from reactor 2 is distributed in the form of a sheet or film on a traveling metallic belt heated at a temperature in the preferred range of about 240°–270° C. and from which the pyrolysis product is removed after the desired residence period of about 1–10 minutes on the hot belt.

The following additional examples are further illustrative of specific conditions for heating urea to decompose it for the production of cyanuric acid in accordance with my invention.

*Example 2.*—The process of this example is carried out in the manner described above and illustrated in the drawing. Fused urea is continuously fed to and heated in a pot reactor at 165° C. for about 2 hours while passing through the body of melt 1.5 mols of air per mol of urea charged per hour of reaction time. About 74% of the urea is decomposed to form a slurry containing about 43% biuret, 30.5% urea, 17% cyanuric acid and 9.5% triuret. This slurry is pumped to and spread as a film 0.06 in. in thickness on a metal surface heated at 250° C. After a 10 minute reaction time on the metal surface, the resulting solid product is removed therefrom. About 63% of the slurry is recovered as product. Volatiles are cooled to separate solid ammonium cyanate and urea from the ammonia. These solids are melted and recycled to the pot reactor.

Operating in this manner, a product containing 81.4% cyanuric acid, 15.8% ammelide and ammeline (mostly ammelide), 1.9% urea and 0.9% triuret was produced. This represents over 98% decomposition of the urea and a cyanuric acid yield of 79.0%, based on the urea supplied to the process.

The process of this example is modified by spreading the urea pyrolysis product as a 0.06 in. film on a metal surface heated at 280° C. The residence period of the material on the hot metal surface is 5 minutes. The resulting product contains 82.8% cyanuric acid, 14.8% ammelide and ammeline (mostly ammelide), 0.4% biuret, 1.5% triuret and 1.1% urea. This represents a 99% decomposition of the urea feed and, with recovery and recycle of ammonium cyanate and urea from the surface heater, a 79.8% cyanuric acid yield, based on the urea supplied to the process.

*Example 3.*—A body of molten urea is heated at 160° C. 60 minutes while passing through the molten urea 1.5 mols of air per mol of urea charged to a pot reactor. A product thus prepared contains 51.8% urea, 36.2% biuret, 6.5% cyanuric acid, 4.9% triuret and 0.6% ammonia. This corresponds to a 52.5% decomposition of the urea supplied to the process. This product of the partial pyrolysis of urea is a pumpable slurry. It is spread as a film 0.06 in. in thickness on a metal surface heated at 280° C. After a residence period of 5 minutes on the hot surface, the resulting solid product is removed therefrom. A product thus prepared contains 76.9% cyanuric acid, 19.9% ammelide and ammeline (mostly ammelide), 0.9% urea, 0.8% biuret and 1.5% triuret. This represents about 99% decomposition of the urea feed and a cyanuric acid yield of 48%, based on the urea feed, without recovery and recycle of urea and ammonium cyanate evolved from the heated film of urea partial pyrolysis product.

The foregoing process was modified by heating the intermediate urea pyrolysis product as a film 0.124 in. in thickness on a surface heated at 280° C. for 15 minutes. The resulting product contained 70.1% cyanuric acid, 22.7% ammelide and ammeline (mostly ammelide), 3.5% urea, 0.8% biuret and 2.9% triuret. This represented a 98% decomposition of the urea and a yield of cyanuric acid amounting to 58%, based on the urea feed. The yield was improved to 67.5% by recovery and recycle of the volatilized urea and ammonium cyanate.

Both in the pyrolysis of urea to form the intermediate product and in heating the film or sheet of that product to produce cyanuric acid, some carbon dioxide is formed and is present in small amount in the ammonia gas evolved in these steps.

As pointed out above, depending upon the ratio of cyanuric acid to urea in the product of the first stage of the urea pyrolysis and its temperature, that product may range from a fluid melt to a mobile slurry. In either case, to further promote rapid and uniform heating of the material, the reactor may be equipped with a mechanical stirrer to supplement the agitation of the reactor contents by the stripping gas.

The following example carrying out the pyrolysis of the urea in a single step may be contrasted with the procedures described above employing my invention. Urea was heated to 220° C. in a pot reactor with continuous stirring. Vigorous decomposition occurred about 170° C. At and above 205° C. the temperature rise was slow due to the very endothermic nature of the reaction taking place. When the cyanuric acid content reached 30%–35% the reaction mixture became a sticky slurry which quickly solidified, making it impossible to further stir the contents of the reactor and resulting in a high temperature gradient between the heat transfer walls and the portions of the reaction mixture more distant from them. After 2½ hours heating the solid product obtained was difficulty broken up and removed from the reaction vessel. Analysis showed it contained 62.7% cyanuric acid, 10.4% urea, 16.3% ammelide and ammeline, 2.3% biuret and 8.3% other material, principle triuret.

In contrast to this procedure, operating in accordance with my invention a greater proportion of the urea supplied to the process is pyrolyzed in a shorter time of heating to obtain a product in which the cyanuric acid content is much higher than in the product obtained by the foregoing process. The heat efficiencies are much higher in the processes of my invention than in this conventional process employing a single pyrolysis step.

I claim:
1. The process for the production of cyanuric acid which comprises first heating a body of molten urea at about 135° C. to 215° C. while dispersing a stripping gas for ammonia within said molten urea and passing the gas through and in intimate contact with the heated body, thereby removing ammonia evolved by decomposition of the urea, continuing said heating until at least about 50% of the urea has been decomposed, discontinuing said heating before unreacted urea in said heated body is decreased to substantially below 30% by weight of the heated body and the resulting product ceases to be mobile when heated to a temperature in the range 135° C. to about 215° C., thereafter spreading the resulting stripped product of the partial pyrolysis of the urea as a sheet no greater than about 0.5 inch in thickness on a hot surface at a temperature in the range 200° C. to 300° C. and maintaining it in contact with said surface at said temperature until the urea is substantially completely decomposed, thereby obtaining a product principally composed of cyanuric acid.

2. The process of claim 1 in which the heating of the body of molten urea is discontinued before the unreacted urea present therein is decreased to substantially below 30% and also before the cyanuric acid present therein increases to above about 20%.

3. The process of claim 1 in which the body of molten urea is first heated at about 155° C. to 190° C. while passing the stripping gas in contact with the molten urea at the rate of 0.5 to 4.0 mols of the gas per hour per mol of urea which is heated.

4. The process of claim 3 in which the heating of the body of molten urea is discontinued before the unreacted urea present therein is decreased to substantially below 30% and also before the cyanuric acid present therein increases to above about 20%.

5. The process of claim 4 in which the product of the partial pyrolysis of the urea is spread as a sheet having a thickness less than 0.3 in. on a metallic surface heated at about 240° C. to about 270° C.

References Cited in the file of this patent
UNITED STATES PATENTS

| | | |
|---|---|---|
| 1,343,833 | Leitch | June 15, 1920 |
| 2,712,491 | Boatright | July 5, 1955 |
| 2,918,467 | Hibbits et al. | Dec. 22, 1959 |
| 2,943,088 | Westfall | June 8, 1960 |

FOREIGN PATENTS

| | | |
|---|---|---|
| 598,175 | Great Britain | Feb. 12, 1948 |
| 628,255 | Great Britain | Aug. 25, 1949 |
| 726,290 | Germany | Oct. 9, 1942 |

OTHER REFERENCES

Chemical Abstracts, volume 50, page 7114 (1956).